Dec. 11, 1962  J. F. BRISCOE  3,067,777
PACKLESS FLOW SWIVEL
Filed June 7, 1960
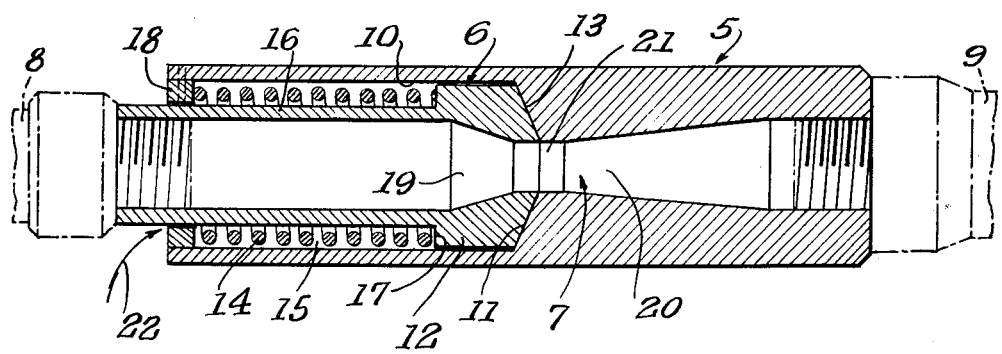
INVENTOR.
JOHN F. BRISCOE
BY C. J. Stratton
ATTORNEY

United States Patent Office 3,067,777
Patented Dec. 11, 1962

3,067,777
PACKLESS FLOW SWIVEL
John F. Briscoe, 226 S. Greenwood, Pasadena, Calif.
Filed June 7, 1960, Ser. No. 34,404
7 Claims. (Cl. 138—44)

This invention relates to a swivel construction for connecting a nozzle and a hose or conduit and for other analogous uses, the invention having for an object to provide a swivel that allows free relative rotational adjustment of a hose and nozzle and yet is completely leak-proof, although of packless construction.

Another object of the invention is to provide a swivel construction in which leakage of the flow therethrough is obviated because pressure of the flow is reduced to below atmospheric or ambient pressure, thereby inhibiting leakage.

A further object of the invention is to provide a swivel of the character above indicated that has a metal-to-metal engagement of the parts and yet, although otherwise packless, will not leak because the same, by lowering the pressure of the flow at the area of such engagement of the swivel parts, creates a partial vacuum that is effective to cause a flow of ambient pressure in a direction to overcome leakage tendencies between the swivel parts.

This invention also has for its objects to provide such means that are positive in operation, convenient in use, easily intalled in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

The FIGURE is a longitudinal sectional view of a packless swivel according to the present invention.

The present swivel comprises, generally, an outer body 5, an inner body 6, and a venturi passage 7 extending through the swivel between an inlet hose or conduit 8, at one end, and a discharge nozzle 9, at the other. In this instance, the hose 8 is shown as connected to the inner body 6 and the nozzle 9 to the outer body 5.

The outer body is shown as an elongated member that is provided with a bore 10 at one end, the same terminating at a conical seat 11, the conical form of which is preferred although the same may have a flat rather than a conical face.

The inner body is formed as an elongated member that has an end 12 in sliding and rotational engagement in the bore 10. Said end 12 terminates in an end face 13 that is complementary to the seat 11 and fits thereagainst. In practice, the seat 11 and face 13 are accurately formed by lapping procedure to fit together with minimum flow or leakage clearance. The fit of the end 12 in bore 10 need not be as accurate, merely close enough to allow for a nice rotational engagement of the parts. The clearance shown is greatly exaggerated for the purposes of illustration.

The structure includes means to retain assembly of the nozzle parts 5 and 6. In this case, said means is shown as a helical spring 14 disposed in an annular space 15 that is defined between the bore 10 and a reduced outer portion 16 of the inner part 6. One end of said spring is end-abutted with an annular shoulder 17 on the end 12, and the other end of said spring is engaged with a retainer ring 18 affixed to the outer body 5. Said spring biases the face 13 into engagement with seat 11 and is essential to the construction only for the purpose of integrating the assembly.

The venturi passage 7, in the usual way, comprises a truncated conical inlet part 19, a truncated conical outlet part 20, and a short cylindrical throat 21 connecting the smaller ends of the conical parts 19 and 20. The operation of this conventional venturi passage depends on the fact that, as the velocity in the throat 21 increases, the pressure therein decreases to cause a suction in said throat, i.e., a pressure lower than atmospheric or ambient pressure. By placing the meeting faces 11 and 13 at the middle of the length of throat 21, any space that may be formed between said faces, regardless how small, is subject to the lowered pressure in the throat and, thereby, causes an inrush of ambient air in the direction of arrow 22. This inrush of air constitutes a positive pressure in relation to internal flow pressure in the passage 7. By means of such differential of pressures, the nozzle cannot leak between the parts 5 and 6 but rather induces an air flow that is inward and counter to any tendency for the flow to leak outwardly.

Although any differential of pressure between the pressure in the throat and ambient pressure will cause such "inward leaking" of ambient air, the venturi passage, by design of the parts 19, 20 and 21 thereof may, for example, be calculated to maintain a pressure of 14 p.s.i. in the throat 21, thereby, providing a suitably lower than atmospheric pressure that tends to inwardly evacuate the sealing area between faces 11 and 13 rather than pressurizing the same.

Regardless of all other considerations of design and proportion, the inner and outer bodies meet at a point intermediate the ends of the throat 21—at the area of the lowest pressure of the flow through the passage 7.

The present swivel will operate without any seals whatever. However, for sealing between the bodies under conditions of static pressure, a small O-ring seal may be placed between the bore 10 and the cylindrical face of the end 12 of the inner body. Such a ring has no effect on the leakless operation of the swivel when under flow pressure, nor is free swivelability between the bodies 5 and 6 affected, since the mentioned pressure differential would still be effective.

A venturi is of minutely specific design, mathematically calculated for the specific purpose of accelerating the fluid flow rate through the throat of same so as to effect a pre-calculated static pressure therein, in applicant's invention not greater than atmospheric. The first or converging section is of specific configuration (entrance angle, radii, fillets, etc.) for the specified media and mass flow rate. The same applies to the throat; this is a most critical part of the venturi as applied in applicant's device. Diameter, length, and circumferential plane of departure of the two sections are designed for each particular aplcation.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A swivel joint for connecting pipes for steady and leak-proof flow through said joint comprising: an outer body having a seat, an inner body having an end extending into said outer body, means holding said bodies with said end in abutting engagement with said seat and against aixal movement but permitting relative rotation of said bodies, connecting longitudinal passages in said bodies for the flow of liquid, said passages tapering inwardly toward each other, a length of cylindrical passage having a diameter equal to that of the small diameter ends of said tapered passages interposed between said small diameter ends, part of the cylindrical passage being in one body and part in the other, the pressure of the fluid flowing through said passages by design of the joint being not more than that of the ambient pressure.

2. A flow swivel according to claim 1 in which said seat and end are of conical form.

3. A flow swivel comprising an outer body having a bore terminating in a seat between the ends of the body, an inner body provided with an end rotationally and slidingly fitted in said bore and having an end face engaged with the seat in the outer body, resilient means interengaging the two bodies and biasing the end of the inner body into resilient engagement with the seat in the outer body, and a venturi passage extending longitudinally, partly through the inner body and partly through the outer body beyond the bore therein, said venturi pasage including a throat intermediate the ends of which said seat and end face are located, the area of engagement between said seat and face being subject to the differential of the designed lower than ambient pressure in said throat and ambient pressure.

4. A flow swivel according to claim 3 in which the resilient means comprises a helical spring disposed in said bore and around the inner member.

5. A flow swivel comprising two end-abutted bodies having a common axis and relatively rotational on said axis, and a venturi passage extending partly through each body and formed with a cylindrical throat which is bisected by the abutting ends of the bodies, the designed lower than ambient pressure in said throat being effective to prevent leakage between the abutting ends to atmosphere.

6. A flow swivel comprising two end-abutted bodies having a common axis and relatively rotational on said axis, resilient means biasing the bodies to resiliently engage the abutted ends thereof, and a venturi passage extending partly through each body and formed with a cylindrical throat which is bisected by the abutting ends of the bodies, the designed lower than ambient pressure in said throat being effective to prevent leakage between the abutting ends to atmosphere.

7. A swivel joint for connecting pipes for steady and leak-proof flow through said joint comprising: an outer body having a seat, an inner body having an end extending into said outer body, means holding said bodies with said end in abutting engagement with said seat and against axial movement but permitting relative rotation of said bodies, connecting longitudinal passages in said bodies for the flow of liquid, said passages tapering inwardly toward each other to form a throat where said passages connect that is the diametrally smallest portion of each passage, said throat being partly in one body and partly in the other, the pressure of the fluid flowing through said passages by design of the joint being not more than that of the ambient pressure.

References Cited in the file of this patent

UNITED STATES PATENTS

| 1,042,852 | Von Boden | Oct. 29, 1912 |
| 1,305,668 | Rieger | June 3, 1919 |
| 1,711,870 | Zerk | May 7, 1929 |
| 2,446,327 | Heinrich | Aug. 3, 1948 |

FOREIGN PATENTS

| 207,026 | Germany | Feb. 17, 1909 |
| 994,633 | France | Aug. 8, 1951 |